United States Patent
Stonehouse et al.

(10) Patent No.: US 6,955,213 B2
(45) Date of Patent: Oct. 18, 2005

(54) EXHAUST GAS HEAT EXCHANGER

(75) Inventors: Matthew Thomas Graham Stonehouse, Coventry (GB); Stewart William Leedham, Nuneaton (GB)

(73) Assignee: Honeywell International, Inc., Morristown, NJ (US)

(*) Notice: Subject to any disclaimer, the term of this patent is extended or adjusted under 35 U.S.C. 154(b) by 154 days.

(21) Appl. No.: 10/182,024

(22) PCT Filed: Jan. 11, 2001

(86) PCT No.: PCT/GB01/00098

§ 371 (c)(1),
(2), (4) Date: Oct. 14, 2002

(87) PCT Pub. No.: WO01/53768

PCT Pub. Date: Jul. 26, 2001

(65) Prior Publication Data

US 2003/0111211 A1 Jun. 19, 2003

(30) Foreign Application Priority Data

Jan. 21, 2000 (GB) ............................................. 0001283

(51) Int. Cl.⁷ ............................................. F28F 27/02
(52) U.S. Cl. ........................................ 165/103; 165/158
(58) Field of Search ................................ 165/103, 158, 165/159, 160

(56) References Cited

U.S. PATENT DOCUMENTS 4,086,956 A    5/1978  Block et al.

FOREIGN PATENT DOCUMENTS

| DE | 805280 | * | 5/1951 | ................. 165/103 |
| DE | 875663 | * | 5/1953 | ................. 165/103 |
| EP | 0987427 | | 7/1999 | |
| FR | 502117 | * | 5/1920 | ................. 165/103 |
| FR | 2238125 | * | 2/1975 | ............ F24H/9/20 |
| GB | 9621 | * | of 1914 | ................. 165/103 |
| GB | 351138 | * | 6/1931 | ................. 165/103 |
| GB | 2184825 | | 7/1987 | |
| JP | 52147359 | | 12/1977 | |
| JP | 06003089 | | 1/1994 | |

\* cited by examiner

Primary Examiner—Allen J. Flanigan
(74) Attorney, Agent, or Firm—Ephraim Starr; Chris James

(57) ABSTRACT

An exhaust gas heat exchanger comprising an external shell (20) extending between two tube plates (30, 31) and defining a coolant chamber; internal tubes (38) forming exhaust gas passages which extend between the tube plates (30, 31); an exhaust gas manifold divided by a baffle plate (29) into first and second chambers (26, 28) with an exhaust gas inlet (25) and outlet (27) respectively. The baffle plate (29) is provided with a valve (51) which can be operated between an open position, which exhaust gas flows along the cooling tubes (38), and a closed position, in which exhaust gas is diverted directly from the first chamber (26) to the second chamber (28).

10 Claims, 4 Drawing Sheets

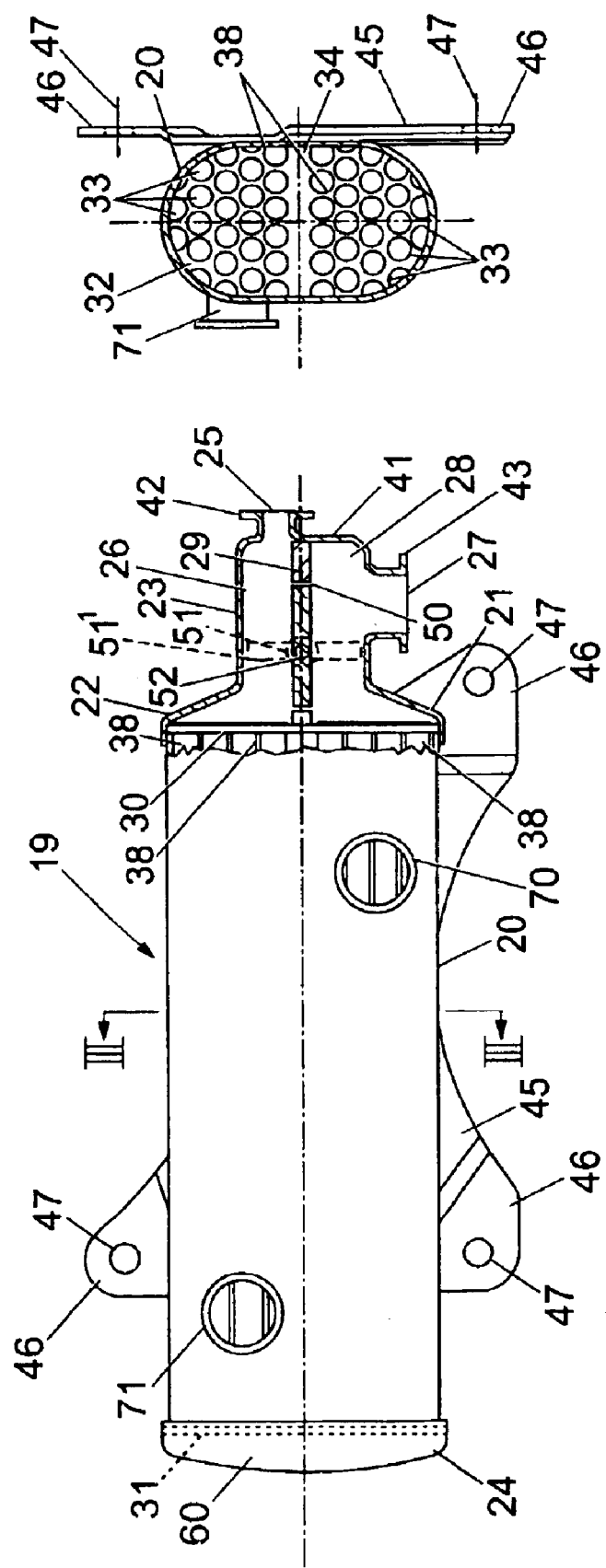

EXHAUST GAS HEAT EXCHANGER

FIELD OF THE INVENTION

This invention relates to an exhaust gas heat exchanger, and relates more particularly but not exclusively to an exhaust gas cooler for reducing the temperature of exhaust gases from internal combustion engines.

BACKGROUND OF THE INVENTION

FIGS. 1a to 1c of the accompanying drawings show a known exhaust gas cooler. This prior art cooler comprises a circular shell 1 fitted with tapered ends 2 which serve as an exhaust gas entry orifice 3 and an exhaust gas exit orifice 4. The orifices 3 & 4 are provided with flange plates 10 for connection to exhaust pipes (not shown). The ends of the shell 1 are sealed by circular tube plates 5 which define a coolant chamber inside the shell 1. Each tube plate 5 has a number of circular holes 6 arranged through it. The holes 6 in each tube plate 5 are connected by a number of small-diameter tubes 7 which are sealed at one end to the first tube plate 5 and at the other end to the second tube plate 5. Exhaust gases flow into the entry orifice 3, along the inside of the small-diameter tubes 7 and out of the exit orifice 4. The exterior of the shell 1 is provided with an entry nozzle 8 and an exit nozzle 9 which respectively supply coolant liquid to and drain coolant liquid from the coolant chamber within the shell 1.

Prior art exhaust gas coolers (such as that shown in FIGS. 1a–1c) are bulky and do not fit easily within the frequently cramped layout of the engine compartment of a road vehicle. The possible positions to fit an exhaust gas cooler within an engine compartment are limited by the fact that the exhaust gases flow into the cooler at one end and flow out at the other end. At certain times, particularly during engine start-up, it is necessary to stop the exhaust gases being cooled. The prior art exhaust gas coolers therefore require special valve and bypass tube arrangements so that exhaust gases can be diverted around the exhaust gas cooler when cooling is not required.

SUMMARY OF THE INVENTION

It is an object of the present invention to provide an exhaust gas heat exchanger capable of functioning as a bypassable exhaust gas cooler which does not require separate means, such as a bypass pipe, to enable exhaust gas flow to bypass the cooler.

According to the present invention there is provided an exhaust gas heat exchanger of the shell and tube type, said heat exchanger comprising a shell having a hollow interior between opposite ends, an exhaust gas manifold secured to one end of the shell, and thermally conductive tube means extending through the interior of the shell from said one end of the shell, the exhaust gas manifold comprising first and second exhaust gas chambers which are mutually adjacent, each of said exhaust gas chambers comprising a respective exhaust gas inlet and an exhaust gas outlet, said tube means providing an exhaust gas flow path between the exhaust gas outlet of said first exhaust gas chamber and the exhaust gas inlet of said second exhaust gas chamber, said heat exchanger being characterised by valve means providing a gas flow path directly between said first and second exhaust gas chambers when said valve means is open, said valve means substantially closing a direct gas flow path between said first and second exhaust gas chambers when said valve means is closed, whereby when a source of flowing exhaust gas is coupled to the exhaust gas inlet of said first exhaust gas chamber and said valve means is closed, exhaust gas is constrained to flow from the exhaust gas inlet of said first exhaust gas chamber to the adjacent exhaust gas outlet of said second exhaust gas chamber by way of said thermally conductive tube means to exchange heat with fluid in the interior of the shell and surrounding said tube means, whereas when said valve means is open, exhaust gas is allowed to flow from the exhaust gas inlet of said first exhaust gas chamber directly to the adjacent exhaust gas outlet of said second exhaust gas chamber and so bypass said tube means.

Said shell may be generally tubular between said opposite ends, and may comprise a fluid inlet and a fluid outlet permitting the flow of fluid from said fluid inlet to said fluid outlet by way of the interior of the shell surrounding the thermally conductive tube means.

Said thermally conductive tube means may comprise a plurality of metal tubes each extending through said one end of the shell with a first sub-set of said plurality of tubes extending from the exhaust gas inlet of said first exhaust gas chamber through said other end of the shell and into a further exhaust gas chamber secured to said other end of the shell, and a second sub-set of said tubes extending from said further exhaust gas chamber through said other end of the shell to the exhaust gas inlet of said second exhaust gas chamber. Said further exhaust gas chamber may be defined by said other end of the shell together with a domed member secured to the shell around said other end.

Alternatively, the thermally conductive tube means may comprise a plurality of metal tubes each extending through said one end of the shell between the exhaust gas outlet of said first exhaust gas chamber and the exhaust gas inlet of said second exhaust gas chamber, with the tubes being U-shaped or any other suitable shape.

Said first and second exhaust gas chambers are preferably mutually contiguous on either side of a common internal wall of the manifold, said valve means being mounted in said common internal wall of the manifold. Said valve means may be a rotary valve mounted for rotation about a rotation axis lying substantially in said common internal wall of the manifold.

The heat exchanger may be such that when said valve means is open to allow exhaust gas to flow from the exhaust gas inlet of said first exhaust gas chamber directly to the exhaust gas outlet of said second exhaust gas chamber, the valve means simultaneously closes either the exhaust gas outlet of said first exhaust gas chamber or the exhaust gas inlet of said second exhaust gas chamber, or said valve means simultaneously closes both the exhaust gas outlet of said first exhaust gas chamber and the exhaust gas inlet of said second exhaust gas chamber.

The exhaust gas heat exchanger is preferably made from stainless steel. The shell may be circular, oval or rectangular in cross-section.

BRIEF DESCRIPTION OF THE DRAWINGS

Embodiments of the invention will now be described by way of example with reference FIGS. 2–6 of the accompanying figures, wherein:

FIG. 2 is a partially cut away side elevation of a first embodiment of exhaust gas cooler;

FIG. 3 is a sectional view on line III—III of the cooler of FIG. 2;

DETAILED DESCRIPTION OF THE PREFERRED EMBODIMENTS

Figure 1C:
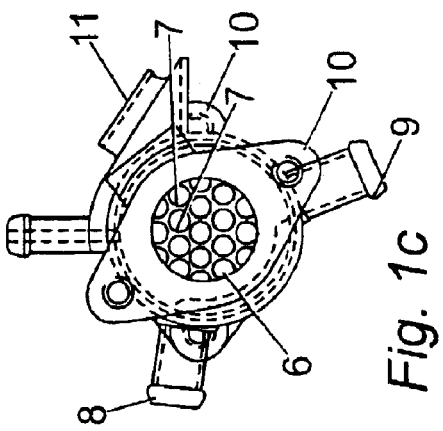

Referring first to FIGS. 2 to 5, these show an exhaust gas cooler 19 forming a first embodiment of exhaust gas heat exchanger in accordance with the invention. The cooler 19 comprises an external cylindrical shell 20. An exhaust gas manifold 21 is secured to one end of the shell 20, the manifold 21 being adapted to fit over the end of the shell 20 and be fastened thereto by any suitable means, e.g. by welding. The manifold 21 comprises a tapered conical portion 22 and a tubular portion 23 whose diameter is less than the diameter of the cylindrical shell 20. At the other end of the shell 20 is a domed cover portion 24 also adapted to fit over the end of the shell 20 and be secured thereto by suitable means, e.g. by welding. The volume between this end of the shell 20 and the domed cover 24 constitutes a further exhaust gas chamber 60 whose purpose will be subsequently detailed.

The tubular portion 23 is provided with an exhaust gas inlet 25 which opens in to a first exhaust gas chamber 26 and an exhaust gas outlet 27 which opens out from a second exhaust gas chamber 28. In use of the cooler 19 in the engine compartment of a road vehicle (not shown), the inlet 25 is connected (directly or by way of an intermediate exhaust conduit (not shown)) to an engine exhaust manifold (not shown) to receive the hot exhaust gases directly from the vehicle engine (not shown), and the outlet 27 is connected to a pipe (not shown) venting to ambient atmosphere (either directly or by way of a silencer (not shown)).

The mutually contiguous first and second exhaust gas chambers 26 and 28 are mutually separated within the manifold 21 by means of a baffle plate 29 which extends across the manifold 21. The baffle plate 29 is sealingly connected to the end wall 41 of the manifold 21 and to a tube plate 30 (described below).

The exhaust gas inlet 25 and outlet 27 are provided with connection flanges 42, 43 with threaded holes 44 which are used for the above-described connections to the inlet 25 and to the outlet 27. However, it is to be understood that other forms of connection may be used.

The opposite ends of the shell 20 are internally sealed by respective tube plates 30 and 31 whose peripheral shapes correspond to the internal profile of the shell 20. The volume bounded by the shell 20 and the plates 30, 31 forms a coolant chamber 32 inside the shell 20. Each tube plate 30 has a number of circular holes 33 arranged through it. The holes 33 are arranged in a close hexagonal packing (CHP) pattern as shown in FIG. 3, with a gap 34 which corresponds to the position of the baffle plate 29. The holes 33 in each tube plate 30, 31 are connected by a number of small-diameter tubes 38 which are sealed at one end to the first tube plate 30 and at the other end to the second tube plate 31. The gap 34 divides the tubes 38 into a first (upper) sub-set of tubes and a second (lower) sub-set of tubes. The first sub-set of tubes 38 extend from the internal outlet from the first (upper) exhaust gas chamber 26, through the first tube plate 30, along the interior of the shell 20 through the coolant chamber 32, and through the second tube plate 31 into the further exhaust gas chamber 60. The second sub-set of tubes 38 extend from the further exhaust gas chamber 60 through the second tube plate 31, along the interior of the shell 20 through the coolant chamber 32, and through the first tube plate 30 to the internal inlet to the second (lower) exhaust gas chamber 28.

The baffle plate 29 has an aperture 50 in which is positioned a butterfly valve 51 mounted on an axial pin 52. The pin 52 passes through seatings 53 in the cover 21 and is connected to a control cable (not shown) so that the valve 51 may be controlled remotely to move between an open position and a closed position. Although the embodiment illustrated in FIGS. 1–5 employs a butterfly valve 51, it is to be understood that the invention can employ any other suitable gas-flow-controlling valve which can be controlled to move between an open position and a closed position (i.e. between a gas-throughflow-permitting position and a gas-throughflow-blocking position).

FIG. 2 shows (in full lines) the valve 51 in its aperture-closing position, in which hot exhaust gases from the vehicle engine are prevented from flowing through the aperture 50, and are instead constrained to flow in through the exhaust gas inlet 25 into the first exhaust gas chamber 26, through the bores of the upper sub-set of small diameter tubes 38, through the further exhaust gas chamber 60 formed by the domed cover 24 and the second tube plate 31, back through the bores of the lower sub-set of small diameter tubes 38, through the second exhaust gas chamber 28 and out of the manifold 20 through the exhaust gas outlet 27.

Figure 1A:
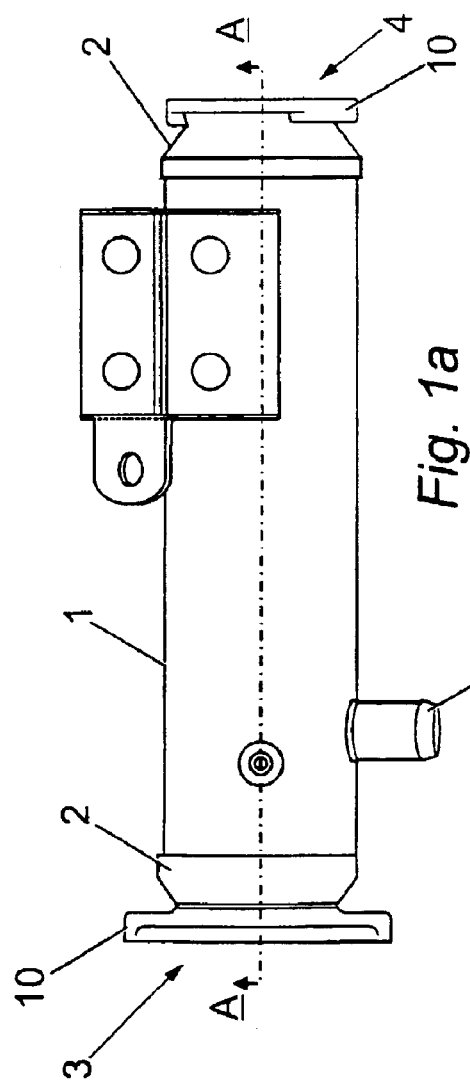
Figure 1B:
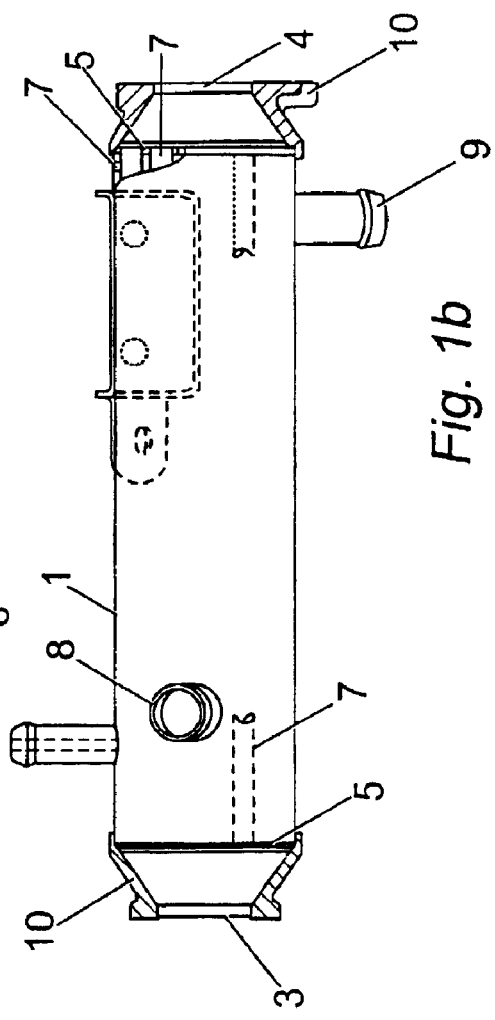
Figure 4:
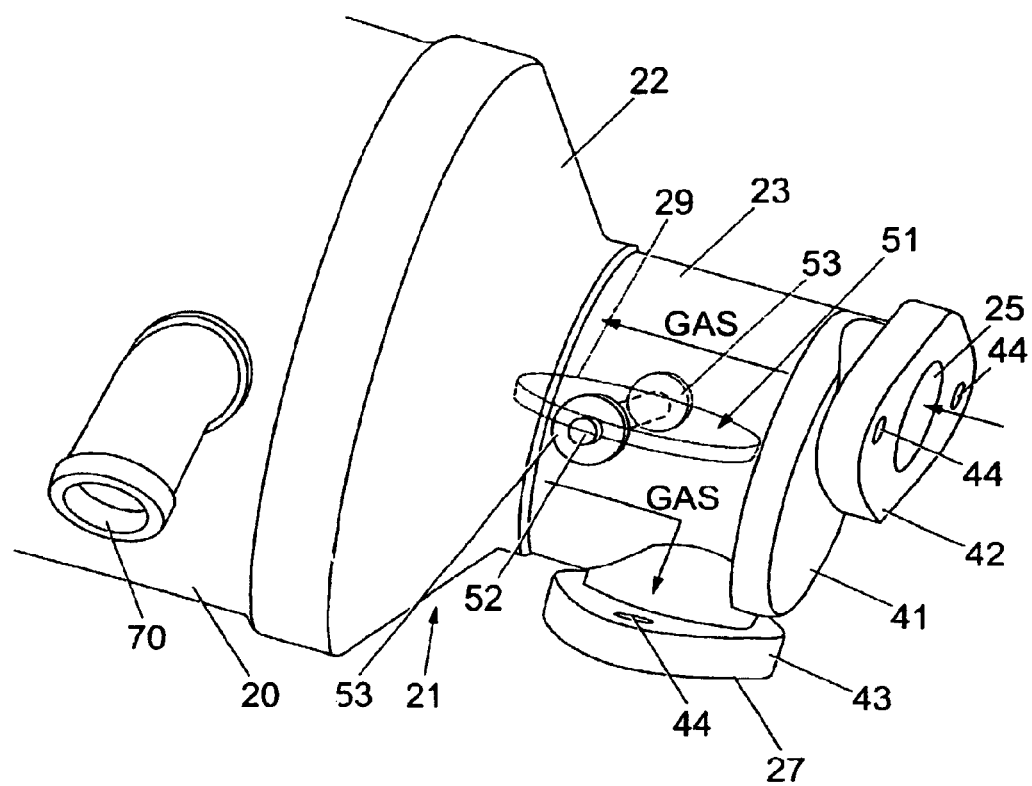
FIG. 4 is a perspective view of the end of the cooler of FIG. 2.
Figure 5:
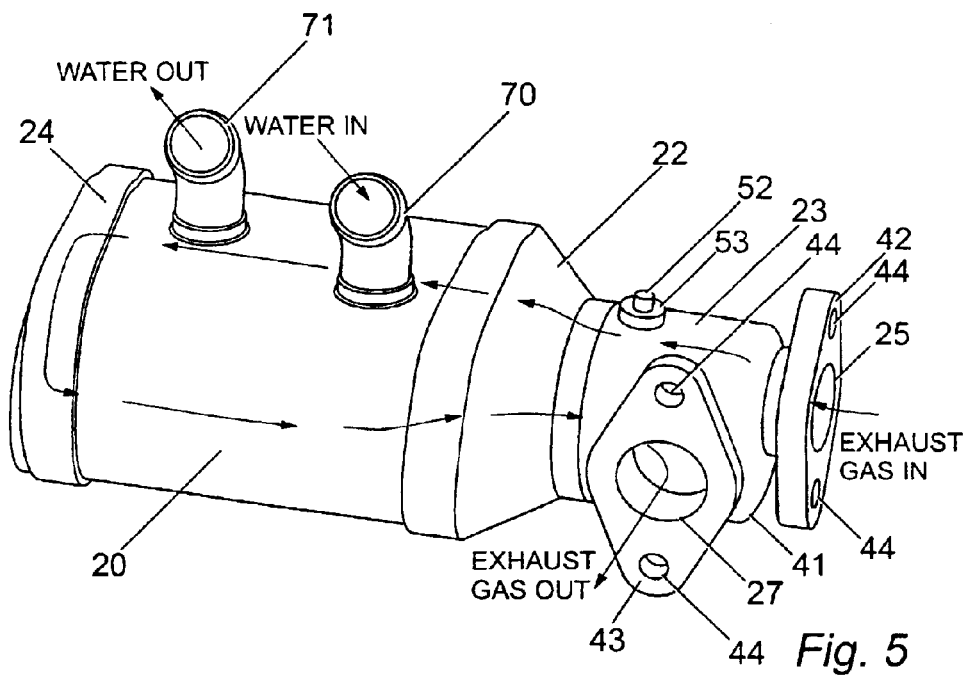
FIG. 5 is a perspective view from below of the cooler of FIG. 2.

In the embodiment illustrated in FIGS. 1–3, the tubes 38 may have a diameter of between 5 and 8 mm, preferably about 6.5 mm. The lateral separation between individual ones of the tubes 38 is preferably about 1 mm or less, such that the tube plates 30 & 31 do not present significant obstructions to the flow of exhaust gases. However the invention is not limited to any particular tube diameter or spacing.

A cooling water inlet pipe 70 is fitted to the shell 20 close to its first end. Similarly, a cooling water outlet 71 pipe is fitted to the shell 20 close to its other end. The inlet and outlet pipes 70, 71 each communicate with the coolant chamber 32 for the supply and draining (respectively) of a coolant fluid (e.g. liquid water). As water (or other coolant fluid) passes from the inlet pipe 70 to the outlet pipe 71 and exhaust gases pass along the small diameter tubes 38, heat transfer takes place from the exhaust gas via the surfaces of the small diameter tubes 38 to the cooling water in the chamber 32.

When the valve 51 is in its aperture-opening position 51' (shown in dotted outline in FIG. 2), the aperture 50 is unblocked by the valve 50 and exhaust gases are permitted to flow from the first exhaust gas chamber 26 directly into the second exhaust gas chamber 28, so bypassing the tubes 38. Simultaneously, the upper half of the valve 51 blocks exhaust gas flow from the first exhaust gas chamber 26 into the upper sub-set of small diameter tubes 38, and the lower half of the valve 51 blocks exhaust gas flow from the lower subset of small diameter tubes 38 into the lower exhaust gas chamber 28. Thereby the exhaust gases are diverted from the first exhaust gas chamber 26, through the aperture 50 in the baffle plate 29, and directly to the second exhaust gas chamber 28, without being cooled by passage through the tubes 38 (from which exhaust gases are blocked by the valve 51 while in its aperture-opening position 51'). Hence the cooler 19 provides a simple means of diverting exhaust gases from the cooler when it is not required to cool the exhaust gases, for example on engine start-up.

A mounting plate 45 is provided on one side of the exhaust gas cooler 19, to enable the cooler 19 to be secured to a suitable mounting (not shown) within the engine compartment. In the embodiment shown in FIGS. 2–5, the mounting plate 45 has three cranked lugs 46 formed by double bending of the plate 45. The cranking of these lugs 46 serves to space the exhaust gas cooler 19 from the surface on which it is mounted. Each lug 46 is formed with a mounting hole 47 for a bolt or other suitable fastener.

Figure 6:
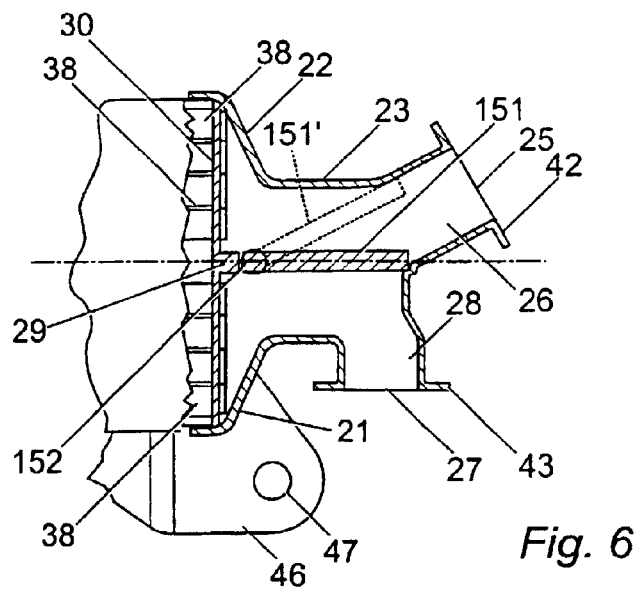
FIG. 6 is a partially cut away side elevation of one end of a second embodiment of exhaust gas cooler.

FIG. 6 shows a second embodiment of exhaust gas cooler similar to that shown in FIGS. 2 to 5 in all essential respects except for the arrangement of the exhaust gas inlet 25, exhaust gas outlet 27, and valve 151. The same reference signs are therefore used in FIG. 6 to indicate components in the second embodiment which are identical or analogous to components of the first embodiment 19 of FIGS. 2–5; for a description of any part of the second embodiment not detailed below, reference should be made to the description of the identical or analogous component in the first embodiment 19.

In the second embodiment, the baffle plate 29 has an aperture 50 in which is positioned a rotatable flap valve 151 mounted on an axial pin 152. The pin 152 is connected to a control cable (not shown) so that the valve 151 may be remotely controlled to rotate between an aperture-closing position and an aperture-opening position as selected by a vehicle driver or other user. Although the second embodiment as illustrated employs a rotatable flap valve 151, it is to be understood that any other suitable valve may alternatively be employed which can be selectively moved between aperture-opening and aperture-closing positions.

FIG. 6 shows (in full lines) the valve 151 in its aperture-closing position, in which exhaust gases are constrained to flow from the exhaust gas inlet 25 through the first exhaust gas chamber 26, along the bores of the upper sub-set of small-diameter tubes 38, through the further exhaust gas chamber 60 formed by the domed cover 24 and the second tube plate 31, back through the bores of the lower sub-set of small-diameter tubes 38, through the second exhaust gas chamber 28 and out through the exhaust gas outlet 27.

In its aperture-closing position, the valve 151 closes off the aperture in the baffle plate 29, so that exhaust gases cannot flow from the first exhaust gas chamber 26 directly to the second exhaust chamber 28.

When the valve 151 is in its aperture-opening position 151' as shown in dotted outline in FIG. 6, the exhaust gases are no longer constrained to pass through the cooling tubes 38, but instead are permitted to flow from the first exhaust gas chamber 26 through the aperture and directly into the second exhaust gas chamber 28, thus bypassing the cooling tubes 38. Furthermore, because the valve 151 positively blocks the passage of exhaust gas from the exhaust gas inlet 25 to the upper sub-set of tubes 38, passage of exhaust gases through the cooling tubes 38 is positively blocked. (Instead of the valve 151 being arranged to swing upwards to block the internal outlet from the first (upper) exhaust gas chamber 26 to the upper sub-set of tubes 38 when in its cooler-bypass configuration, the valve 151 could alternatively be arranged to swing downwards to block the internal inlet from the lower sub-set of tubes 38 to the second exhaust (lower) gas chamber 28, it being necessary to block gas flow through the tubes 38 at one end only of these tubes.)

The fact that access is required to only one end of the cooler for connection of exhaust gas pipes to the inlet and outlet enables the exhaust gas cooler of the invention to fit into spaces in the engine compartment which could otherwise not be utilised, while maintaining the benefits of closely packed tubes forming the cooling core. The layout of the gas flows in the cooler according to the invention to provide twice-through flow of exhaust gases coupled with a valve-operated bypass facility is novel while still maximising the efficiency of the gas and coolant flow. The cooler is highly resistant to corrosion due to its stainless steel construction, and very robust due to the absence of sharp corners on the exterior tube.

Although the illustrated embodiments of the invention preferably employ a close hexagonal packing arrangement of the internal tubes 38, it is to be understood that other tube packing arrangements are possible without departing from the scope of the invention. Although the shell 20 is illustrated as having a transverse cross-section that is generally oval, it is to be understood that other cross-sectional shapes are possible without departing from the scope of the invention; e.g. cross-sectional shapes which are circular or rectangular.

The manifold 21 and cover 24 which define the various exhaust gas chambers can be formed in various ways. If the manifold 21 is formed as a casting, then the baffle plate 29 may be cast as part of a single-cast gas box unit. If the manifold 21 is pressed from sheet, the baffle 29 may be attached to the manifold 21 by brazing or welding.

Instead of utilising two tube plates 30, 31 with straight tubes 38 extending between the two tube plates, a single tube plate (equivalent to 31) could be employed, with U-shaped tubes extending between holes in the upper half of the single tube plate to holes in the lower half of the same tube plate to carry the exhaust gases through the coolant chamber. As well as halving the number of tube/plate connections, the further exhaust chamber 60 could also be eliminated; these advantages might outweigh the disadvantage of having to use non-straight tubes.

Other modifications and variations of the invention can be adopted without departing from the scope of the invention as defined in the appended claims.

What is claimed is:

1. An exhaust gas heat exchanger of the shell and tube type, said heat exchanger comprising a shell having a hollow interior between opposite ends, an exhaust gas manifold secured to one end of the shell, and thermally conductive tube means extending through the interior of the shell from said one end of the shell, the exhaust gas manifold comprising first and second exhaust gas chambers which are mutually adjacent, each of said exhaust gas chambers comprising a respective exhaust gas inlet and an exhaust gas outlet, wherein the exhaust gas inlet of the first exhaust chamber and the exhaust gas outlet of the second exhaust chamber are disposed at an angle greater than 0° and less than 180°, said tube means providing an exhaust gas flow path between the exhaust gas outlet of said first exhaust gas chamber and the exhaust gas inlet of said second exhaust gas chamber, said heat exchanger being characterised by valve means providing a gas flow path directly between said first and second exhaust gas chambers and substantially closing the exhaust gas outlet of the first exhaust chamber when said valve means is fully open, said valve means substantially closing a direct gas flow path between said first and second exhaust gas chambers when said valve means is closed, whereby when a source of flowing exhaust gas is coupled to the exhaust gas inlet of said first exhaust gas chamber and said valve means is closed, exhaust gas is constrained to flow from the exhaust gas inlet of said first exhaust gas chamber to the adjacent exhaust gas outlet of said second exhaust gas chamber by way of said thermally conductive tube means to exchange heat with fluid in the interior of the shell and surrounding said tube means, whereas when said valve means is open, exhaust gas is allowed to flow from the exhaust gas inlet of said first exhaust gas chamber directly to the adjacent exhaust gas outlet of said second exhaust gas chamber and so bypass said tube means.

2. A heat exchanger as claimed in claim 1 characterised in that said shell is generally tubular between said opposite ends, and comprises a fluid inlet and a fluid outlet permitting the flow of fluid from said fluid inlet to said fluid outlet by way of the interior of the shell surrounding the thermally conductive tube means.

3. An exhaust gas heat exchanger of the shell and tube type, said heat exchanger comprising a shell having a hollow interior between opposite ends, an exhaust gas manifold secured to one end of the shell, and thermally conductive tube means extending through the interior of the shell from said one end of the shell, the exhaust gas manifold comprising first and second exhaust gas chambers which are mutually adjacent, each of said exhaust gas chambers comprising a respective exhaust gas inlet and an exhaust gas outlet, said tube means providing an exhaust gas flow path between the exhaust gas outlet of said first exhaust gas chamber and the exhaust gas inlet of said second exhaust gas chamber, said heat exchanger being characterised by valve means providing a gas flow path directly between said first and second exhaust gas chambers when said valve means is open, said valve means substantially closing a direct gas flow path between said first and second exhaust gas chambers when said valve means is closed, whereby when a source of flowing exhaust gas is coupled to the exhaust gas inlet of said first exhaust gas chamber and said valve means is closed, exhaust gas is constrained to flow from the exhaust gas inlet of said first exhaust gas chamber to the adjacent exhaust gas outlet of said second exhaust gas chamber by way of said thermally conductive tube means to exchange heat with fluid in the interior of the shell and surrounding said tube means, whereas when said valve means is open, the exhaust gas outlet of said first exhaust gas chamber is substantially closed and exhaust gas is allowed to flow from the exhaust gas inlet of said first exhaust gas chamber directly to the adjacent exhaust gas outlet of said second exhaust gas chamber and so bypass said tube means and wherein said thermally conductive tube means comprises a plurality of metal tubes extending through said one end of the shell, and in that a first sub-set of said plurality of tubes extends from the exhaust gas inlet of said first exhaust gas chamber through said other end of the shell and into a further exhaust gas chamber secured to said other end of the shell, and in that a second sub-set of said tubes extends from said further exhaust gas chamber through said other end of the shell to the exhaust gas inlet of said second exhaust gas chamber.

4. A heat exchanger as claimed in claim 3, characterised in that said further exhaust gas chamber is defined by said other end of the shell together with a domed member secured to the shell around said other end of the shell.

5. A heat exchanger as claimed in claim 1, characterised in that said thermally conductive tube means comprises a plurality of metal tubes extending through said one end of the shell between the exhaust gas outlet of said first exhaust gas chamber and the exhaust gas inlet of said second exhaust gas chamber.

6. A heat exchanger as claimed in claim 5, characterised in that said tubes are U-shaped.

7. A heat exchanger as claimed in claim 1, characterised in that said first and second exhaust gas chambers are mutually contiguous on either side of a common internal wall of the manifold, said valve means being mounted in said common internal wall of the manifold.

8. A heat exchanger as claimed in claim 7, characterised in that said valve means is a rotary valve mounted for rotation about a rotation axis lying substantially in said common internal wall of the manifold.

9. A heat exchanger as claimed in claim 1, characterised in that when said valve means is open to allow exhaust gas to flow from the exhaust gas inlet of said first exhaust gas clamber directly to the exhaust gas outlet of said second exhaust gas chamber, the valve means substantially simultaneously closes the exhaust gas inlet of said second exhaust gas chamber.

10. A heat exchanger as claimed in claim 1, characterised in that when said valve means is open to allow exhaust gas to flow from the exhaust gas inlet of said first exhaust gas chamber directly to the exhaust gas outlet of said second exhaust gas chamber, said valve means substantially directs exhaust gas in the first exhaust chamber at an angle and toward the second exhaust gas chamber.

* * * * *